(12) United States Patent
Thyni et al.

(10) Patent No.: US 8,595,531 B2
(45) Date of Patent: Nov. 26, 2013

(54) ENERGY EFFICIENT ETHERNET NETWORK NODES AND METHODS FOR USE IN ETHERNET NETWORK NODES

(75) Inventors: Tomas Thyni, Järfälla (SE); Christian Gotare, Getinge (SE); Johan Kölhi, Vaxholm (SE); Annikki Welin, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 182 days.

(21) Appl. No.: 13/258,070

(22) PCT Filed: Mar. 31, 2009

(86) PCT No.: PCT/SE2009/050341
§ 371 (c)(1),
(2), (4) Date: Sep. 21, 2011

(87) PCT Pub. No.: WO2010/114439
PCT Pub. Date: Oct. 7, 2010

(65) Prior Publication Data
US 2012/0017105 A1    Jan. 19, 2012

(51) Int. Cl.
*G06F 1/00* (2006.01)
(52) U.S. Cl.
USPC .......................................... 713/323; 370/465
(58) Field of Classification Search
USPC .................................. 713/323, 322; 370/465
See application file for complete search history.

(56) References Cited

U.S. PATENT DOCUMENTS

| 6,993,667 B1 | 1/2006 | Lo |
| 2002/0196736 A1 | 12/2002 | Jin |
| 2005/0097378 A1 | 5/2005 | Hwang |
| 2008/0232290 A1 | 9/2008 | Elzur et al. |
| 2008/0304519 A1 | 12/2008 | Koenen et al. |
| 2009/0119524 A1 | 5/2009 | Hays |

FOREIGN PATENT DOCUMENTS

| JP | 2002335262 A | 11/2002 |
| JP | 2006-293983 | 10/2006 |
| JP | 2007524304 A | 8/2007 |
| WO | 99/54806 A1 | 10/1999 |
| WO | 03096651 A1 | 11/2003 |
| WO | 2006099322 A1 | 9/2006 |
| WO | 2009064439 A2 | 5/2009 |

OTHER PUBLICATIONS

International Search Report for PCT/SE2009/050341 dated Dec. 22, 2009, 4 pages.
Japanese Office Action for Patent Application No. 2012-503357, mailed Feb. 20, 2013, 8 pages.

*Primary Examiner* — Clifford Knoll
(74) *Attorney, Agent, or Firm* — Withrow & Terranova, PLLC

(57) ABSTRACT

The present invention relates to a transmitting node for transmitting data to a receiving node over at least one Ethernet link comprising a data communication unit arranged to transmit data over the at least one Ethernet link, and a control unit arranged to control the data communication unit so as to maintain the at least one Ethernet link in a link active state, characterized in that the control unit is arranged to operate in a first IDLE state in which IDLE data packets are transmitted periodically through the data communication unit over the at least one Ethernet link according to at least one predetermined IDLE data packet timing interval, and in said first IDLE state, power down at least one component comprised in the data communication unit in between the periodic transmissions of IDLE data packets. The present invention further relates to a method for use in a transmitting node, a receiving node, a network node and a system.

17 Claims, 10 Drawing Sheets

ENERGY EFFICIENT ETHERNET NETWORK NODES AND METHODS FOR USE IN ETHERNET NETWORK NODES

TECHNICAL FIELD

The present invention relates to the field of data communication, and in particular to energy efficient Ethernet network nodes. The present invention further relates to methods for use in Ethernet network nodes and a system comprising energy efficient Ethernet network nodes.

BACKGROUND

An Ethernet network is today a very common way of achieving data communication between network nodes in both local area networks (LANs) and wide area networks (WANs). Ethernet communication is standardized by standard documentation, such as, for example, IEEE 802.3-2005, which defines how data transmissions are to be performed over the various layers of Ethernet network interfaces.

Ethernet network nodes may attach through the use of Ethernet network interfaces to a common medium that provides a path along which signals carrying data can travel in between the Ethernet network nodes. This medium may, for example, be twisted pair copper cabling or fibre optic cabling.

However, with an increasing number Ethernet nodes connected in data communication networks and thus an increase in power-consuming Ethernet interface electronics, along with an increased cost-effective and environmental interest in saving energy, there is a need to provide more energy efficient Ethernet network nodes.

SUMMARY

A problem to which the present invention relates is the problem of achieving Ethernet network nodes with reduced energy consumption.

This problem is addressed by a transmitting node for transmitting data to a receiving node over at least one Ethernet link comprising a data communication unit arranged to transmit data over the at least one Ethernet link, and a control unit arranged to control the data communication unit so as to maintain the at least one Ethernet link in a link active state, characterized in that the control unit is arranged to operate in a first IDLE state in which IDLE data packets are transmitted periodically through the data communication unit over the at least one Ethernet link according to at least one predetermined IDLE data packet timing interval, and in said first IDLE state, power down at least one component comprised in the data communication unit in between the periodic transmissions of IDLE data packets.

The problem is also addressed by a method for use in a transmitting node for transmitting data to a receiving node over at least one Ethernet link, wherein said transmitting node comprises a data communication unit arranged to transmit data over the at least one Ethernet link, and a control unit arranged to control the data communication unit so as to maintain the at least one Ethernet link in a link active state, characterized in that the method comprises the step of: switching in the control unit in the transmitting node to operate in a first IDLE state in which IDLE data packets are transmitted periodically over the at least one Ethernet link according to at least one predetermined IDLE data packet timing interval, and when operating in a first IDLE state, powering down at least one component comprised in a data communication unit in between the periodic transmissions of IDLE data packets.

By having the control unit in a transmitting node arranged to operate in an alternative first IDLE state wherein IDLE data packets are only transmitted periodically over the Ethernet link and powering down at least one component in between said periodic transmissions, the invention allows the power consumption of the transmitting node to be reduced as compared to operating in the standardized IDLE state wherein such IDLE data packets are transmitted continuously. This because the optical and/or electronic components comprised in the Ethernet network interface in a conventional Ethernet network node in the standardized IDLE state, are required to continuously be operational and thus require a continuous power supply.

An advantage of the above described invention is that it is capable of maintaining an Ethernet link in a link active state without requiring the Ethernet network nodes to remain synchronised. This is not possible within the current Ethernet standard.

According to another aspect of the invention, the at least one predetermined IDLE data packet timing interval may be any predetermined period of time deemed suitable for a particular application. However, the at least one predetermined IDLE data packet timing interval may also be based upon a time period at least long enough so as to allow at least one component comprised in the data communication unit to be powered down and then powered back up again by the data communication unit before sending the next IDLE data packet. The latter provides the effect of being able to establishing at least a minimal suitable period of time for the at least one predetermined IDLE data packet timing interval in order for a particular application to benefit from the invention.

According to a further aspect of the invention, the at least one predetermined IDLE data packet timing interval may also be based upon a time period at least long enough so as to allow a plurality of components comprised in the data communication unit to be powered down and then powered back up again by the data communication unit before sending the next IDLE data packet. This provides the effect of being able to establish at least a minimal period of time for the at least one predetermined IDLE data packet timing interval in order for a particular application to fully benefit from the invention.

Another advantage of the above described invention is that it is particularly advantageous for transmission nodes comprising a data communication unit arranged to transmit said IDLE data packets over an optical network, such as, a single mode optical fibre network or multimode optical fibre network. This is because the optical and/or electronic components and circuitry in such data communication units, such as, optical transmitters or lasers, are often more energy consuming than the electronic components and circuitry used in, for example, a twisted copper pair network.

According to another aspect of the invention, the transmitting node can further be arranged to negotiate the use of the first IDLE state during auto-negotiation with a receiving node when establishing the Ethernet link, since the first IDLE state according to the invention may be implemented as a possible operational mode of the control unit in the transmitting node. This enables, for example, the transmitting node to still be compatible with other Ethernet network nodes that do not have the first IDLE state implemented as a possible operational mode. However, the first IDLE state may also be a pre-configured operational mode of the control unit in the transmitting node.

According to a further aspect of the invention, the transmitting node may comprise a predetermined data transmission inactivity timer arranged to indicate that the control unit in the transmitting node should switch to the first IDLE state. Furthermore, the control unit in the transmitting node may also be arranged to receive a first IDLE state initiation signal from a higher level function or protocol. This enables the transmitting node to automatically switch to operating in the first IDLE state.

The problem stated above is further addressed by a receiving node for receiving data from a transmitting node over at least one Ethernet link comprising a data communication unit arranged to receive data over the at least one Ethernet link, and a control unit arranged to control the data communication unit so as to maintain the at least one Ethernet link in a link active state, characterized in that the control unit is arranged to operate in a first IDLE state in which IDLE data packets are received periodically through the data communication unit over the at least one Ethernet link according to at least one predetermined IDLE data packet timing interval, and when operating in the first IDLE state, maintain the Ethernet link in a link active state in between the periodic receptions of IDLE data packets.

According to an aspect of the invention, the control unit in the receiving node may switch to the standard IDLE state upon continuously receiving IDLE data packets over the Ethernet link. Furthermore, the control unit in the receiving node may directly exit the first IDLE state as actual data is received over the Ethernet link.

The problem stated above is further addressed by a method for use in a receiving node for receiving data from a transmitting node over at least one Ethernet link, wherein said receiving node comprises a data communication unit arranged to transmit data over the at least one Ethernet link, and a control unit arranged to control the data communication unit so as to maintain the at least one Ethernet link in a link active state, characterized in that the method comprises the steps of: switching in the control unit in the receiving node to operate in a first IDLE state in which IDLE data packets are received periodically through the data communication unit over the at least one Ethernet link according to at least one predetermined IDLE data packet timing interval, and when operating in the first IDLE state, maintaining the Ethernet link in a link active state in between the periodic receptions of IDLE data packets.

The problem stated above is further addressed by a network node for transmitting and receiving data over at least one Ethernet link, comprising at least one transmitting node according to the transmitting node described above, and at least one receiving node according to the receiving node described above.

The problem stated above is further addressed by a system for transmitting and receiving data over at least one Ethernet link, comprising at least one transmitting node according to the transmitting node described above and at least one receiving node according to the receiving node described above; or at least one at least one transmitting node according to the transmitting node described above or at least one receiving node according to the receiving node described above, and at least one network node according to the network node described above; or at least a first and a second network node according to the network node described above.

Further advantageous embodiments of the method for use in a transmitting node are set forth in the dependent claims and correspond to advantageous embodiments already set forth with reference to the previously mentioned transmitting node.

BRIEF DESCRIPTION OF THE DRAWINGS

The objects, advantages and effects as well as features of the invention will be more readily understood from the following detailed description of exemplary embodiments of the invention when read together with the accompanying drawings, in which.

DETAILED DESCRIPTION

Figure 1:
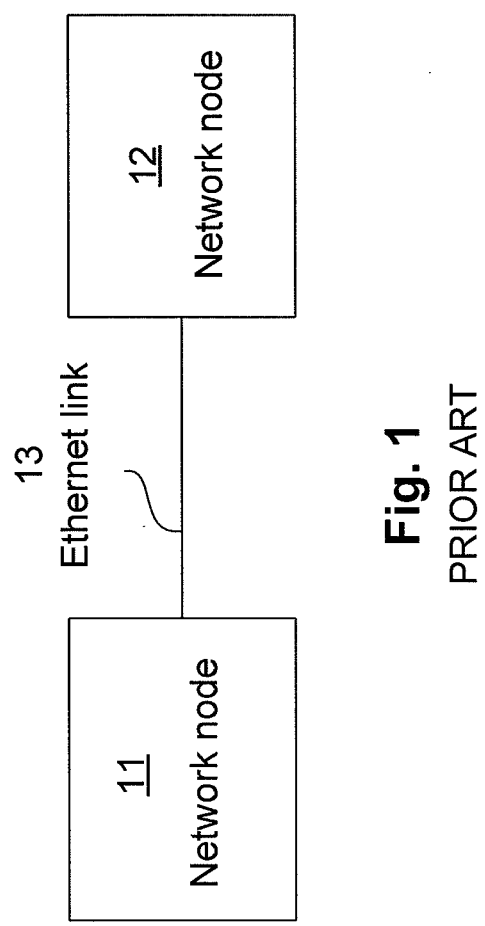
FIG. 1 shows an example of an Ethernet network according to prior art.

FIG. 1 shows an example of an Ethernet network 10 according to prior art. The Ethernet network 10 comprises a first Ethernet network node 11 and a second Ethernet network node 12. The first and second Ethernet network node 11, 12 each comprises an Ethernet interface between which an Ethernet link 13 is established. The medium supporting the Ethernet link 13 over which the Ethernet interfaces of the first and second Ethernet network node 11, 12 may be adapted to transmit and/or receive data, may be e.g. twisted pair copper cabling or fibre optic cabling. Data communication over the Ethernet link 13 may be performed by the first and second Ethernet network node 11, 12 in accordance with the Ethernet standard described in the standard documentation IEEE 802.3-2005, also sometimes referred to as IEEE 802.3ad. It should be noted that hereinafter, when reference is made to the Ethernet standard, the Ethernet standard according to and described in the standard documentation IEEE 802.3-2005 is intended.

Figure 2:
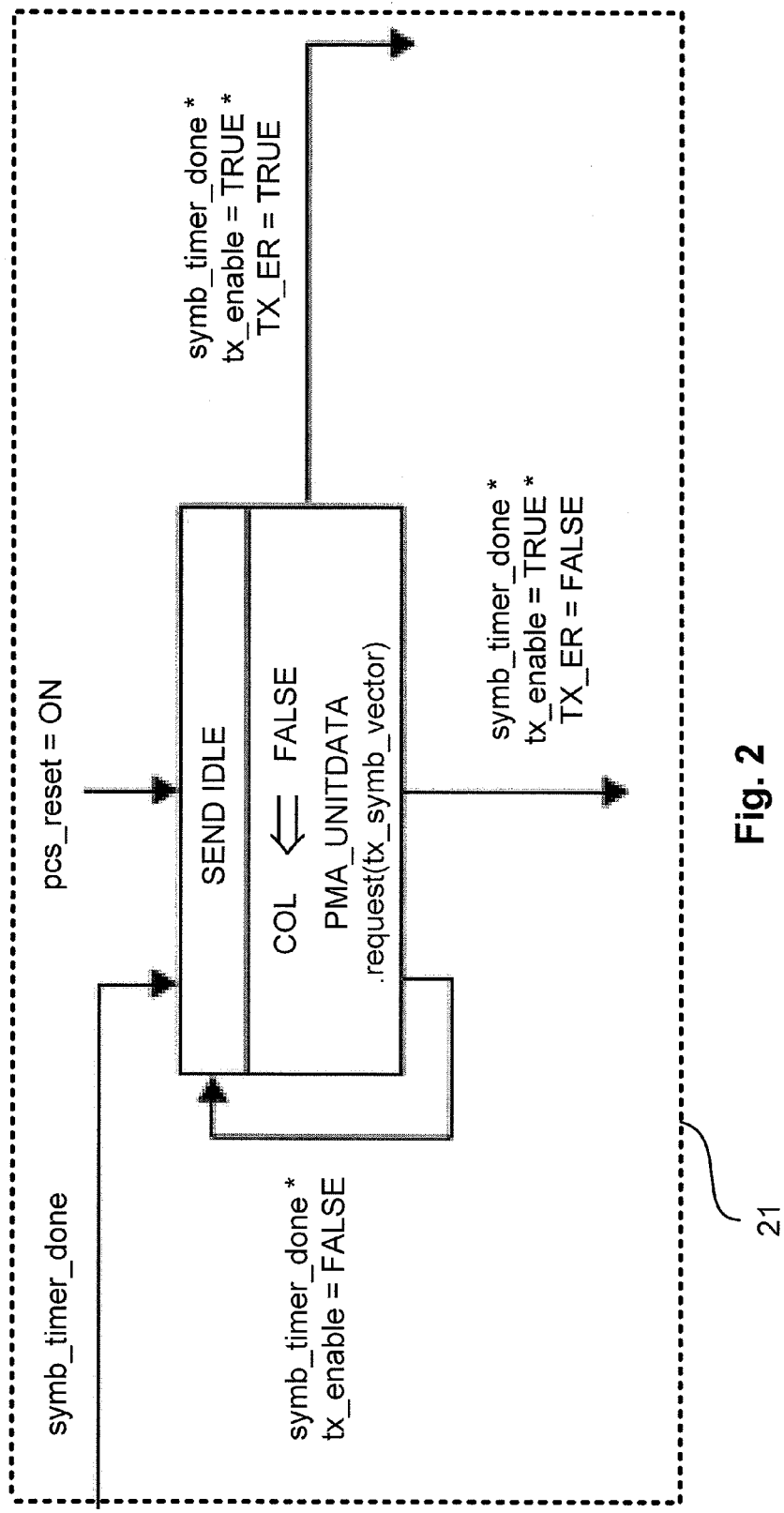
FIG. 2 shows a part of a transmit state diagram of an Ethernet network node according to IEEE Std. 802.3-2005, FIG. 32-12.
Figure 12:
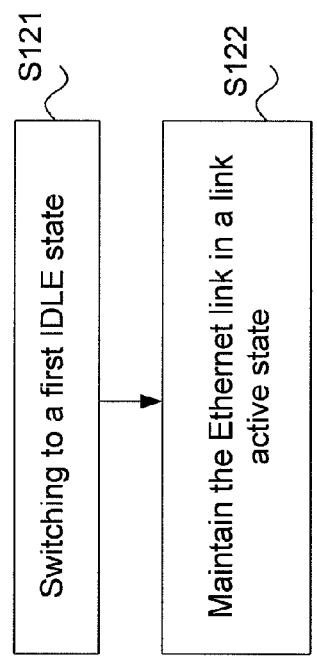
FIG. 12 shows a flowchart illustrating a further method according to an exemplary embodiment of the invention.

FIG. 2 shows a part of a transmit state diagram according to FIG. 32-12 in IEEE Std. 802.3-2005 of an Ethernet network node 11 according to prior art. The area encircled by the dashed line depicts the standard IDLE state 21 of an Ethernet network node 11. For illustrative purposes, the Ethernet network node 11 is considered the transmitting node, and the Ethernet network node 12 as the receiving node. The transmitting node 11 enters the standard IDLE state 21 any time there is no actual data to transmit. In the standard IDLE state 21, a continuous stream of IDLE data packets are transmitted by the transmitting node 11 over the Ethernet link 13 to the receiving node 12. This may be performed in order to maintain the Ethernet link 13 in a link active state and to keep the transmitting node 11 and the receiving node 12 synchronised. It should also be noted that the continuous stream of IDLE data packets may in some cases in the prior art be referred to as periodic transmissions of IDLE data packets; however, in these cases, this is only true as long as the periodic transmissions of the IDLE data packets occur within particular implementation specific time limits in order for the Ethernet link 13 to remain in a link active state and for the transmitting node 11 and the receiving node 12 to be kept synchronised. Examples of different groups in which these particular implementation specific time limits may be chosen to be implemented may include the medium by itself (such as, cables or optical cables that may check the loss of light, etc.), the Ethernet OAM (Operation, Administration and Maintenance) function, the STP/RSTP (Spanning Tree Protocol/Rapid Spanning Tree Protocol) protection function in Ethernet, or Ethernet CFM (Connectivity Fault Management) which may use it at the link level. For enabling such standardised IDLE data packet transmissions as described above, all of the optical and/or electronic components and circuitry comprised in the Ethernet network interface of the transmitting node 11 for transmitting any form of data over the Ethernet link 13 are required to be continuously operational at all times. Therefore, the optical and/or electronic components and circuitry will continuous draw a constant supply of energy from the power feed of the transmitting node 11 in order to maintain the Ethernet link 13 in a link active state.

If the medium supporting the Ethernet link 13 comprises fibre optic cabling, the power consumption of the essential optical and/or electronic components and circuitry will be larger than compared to, for example, twisted pair copper cabling. This is because, although the fibre optic cabling has some advantages over twisted pair copper cabling in that it provides, for example, improved performance, higher data rates, and enables large distances between the transmitting node 11 and the receiving node 12, the fibre optic cabling also requires optical and/or electrical components and circuitry which conventionally consumes more electricity than, for example, traditional twisted pair copper wire solutions.

Figure 3:
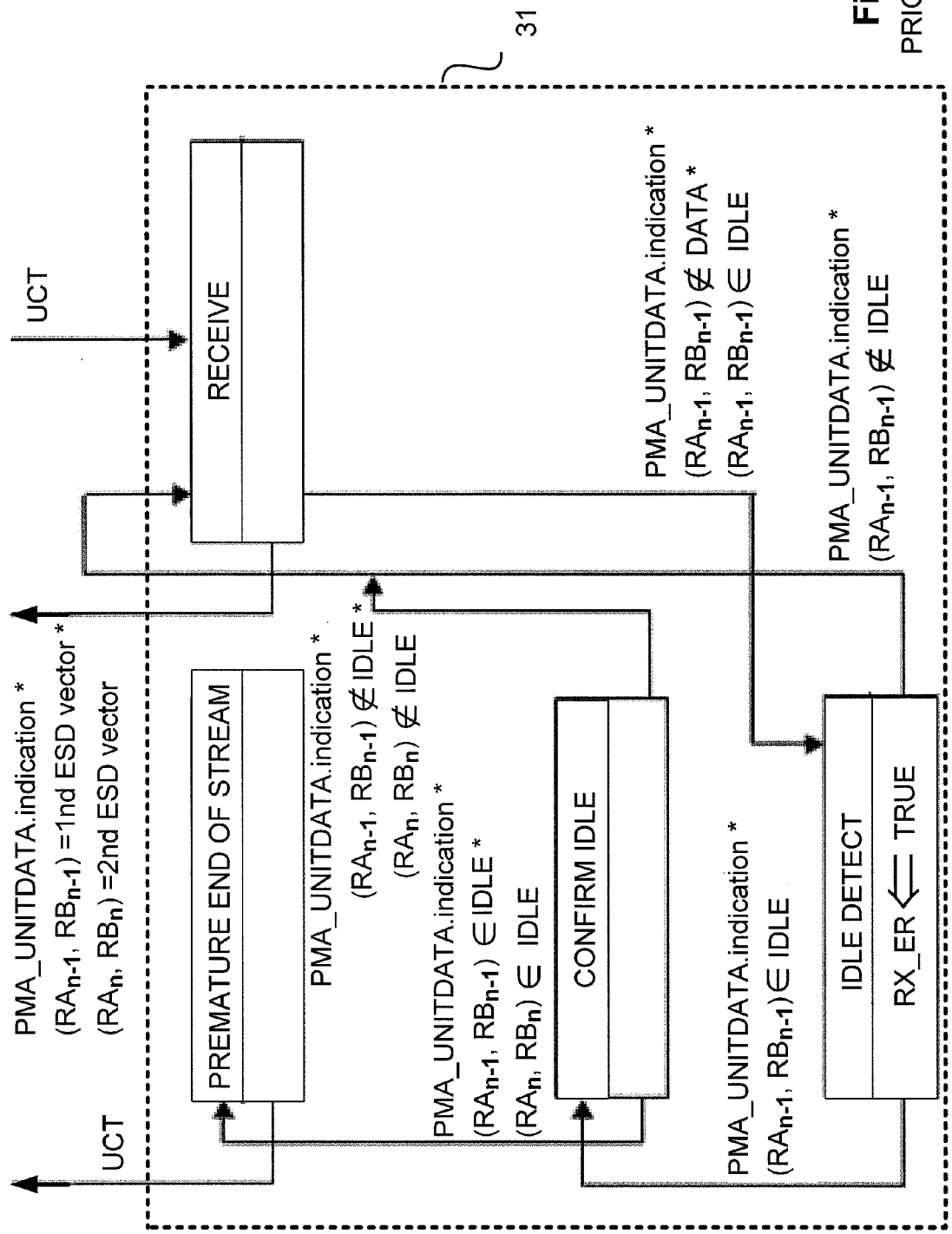
FIG. 3 shows a part of a receive state diagram of an Ethernet network node according to IEEE Std. 802.3-2005, FIG. 32-13.

FIG. 3 shows a part of a receive state diagram according to FIG. 32-13 in IEEE Std. 802.3-2005 of an Ethernet network node 12 according to prior art. The area encircled by the dashed line depicts the standard IDLE state 31 of an Ethernet network node 12. Here, again for the purpose of illustration, the Ethernet network node 11 is considered the transmitting node, and the Ethernet network node 12 as the receiving node. The receiving node 12 enters the standard IDLE state 31 as it detects and receives the continuous stream of IDLE data packets that are transmitted by the transmitting Ethernet network node 11 over the Ethernet link 13. The receiving node 12 is therefore arranged to detect and receive a continuous stream of IDLE data packets any time no actual data is received. However, in a normal implementation according to the Ethernet standard, if no continuous stream of IDLE data packets as described above is received from the transmitting node 11 for a particular implementation specific period of time, the receiving node 12 will consider itself as not synchronised with the transmitting node 11 and the Ethernet link 13 as failed or down, i.e. in a non-active state. In order to be able to transmit and receive data again, the transmitting node 11 and the receiving node 12 would have to re-establish the Ethernet link 13. It should also be noted that this is also the case for the continuous stream of IDLE data packets, referred to in some cases in the prior art as periodic transmissions, within the Ethernet standard as described above.

Furthermore, some existing modes of operation for use in Ethernet network nodes, commonly referred to as low power link state functions, green Ethernet or the like, are directed towards reducing the energy consumption only when an Ethernet network node at one end of the Ethernet link is disconnected or powered off. Today, there are no energy-saving solutions directed towards active Ethernet links.

As is evident from the above, a problem experienced in conventional Ethernet networks is to provide more energy efficient Ethernet network nodes, particularly in Ethernet network nodes having active Ethernet links.

According to the inventive features of the invention, this problem is addressed by having a control unit in a transmitting node being arranged to operate in an alternative first IDLE state wherein IDLE data packets are only transmitted periodically over the Ethernet link. In this first IDLE state, the time duration between the periodic transmissions of the IDLE data packets outside the normal implementation specific time limits in order for an Ethernet link to remain in a link active state and for a transmitting node and a receiving node to be kept synchronised. Together with a correspondingly configured receiving node, the transmitting node in this way enables the power consumption of the essential optical and/or electronic components and circuitry comprised in the transmitting node to be reduced since these may selectively be powered down in between the periodic transmissions. Advantageous exemplary embodiments of the invention are described in more detail below with reference to FIGS. 4-11.

Figure 4:
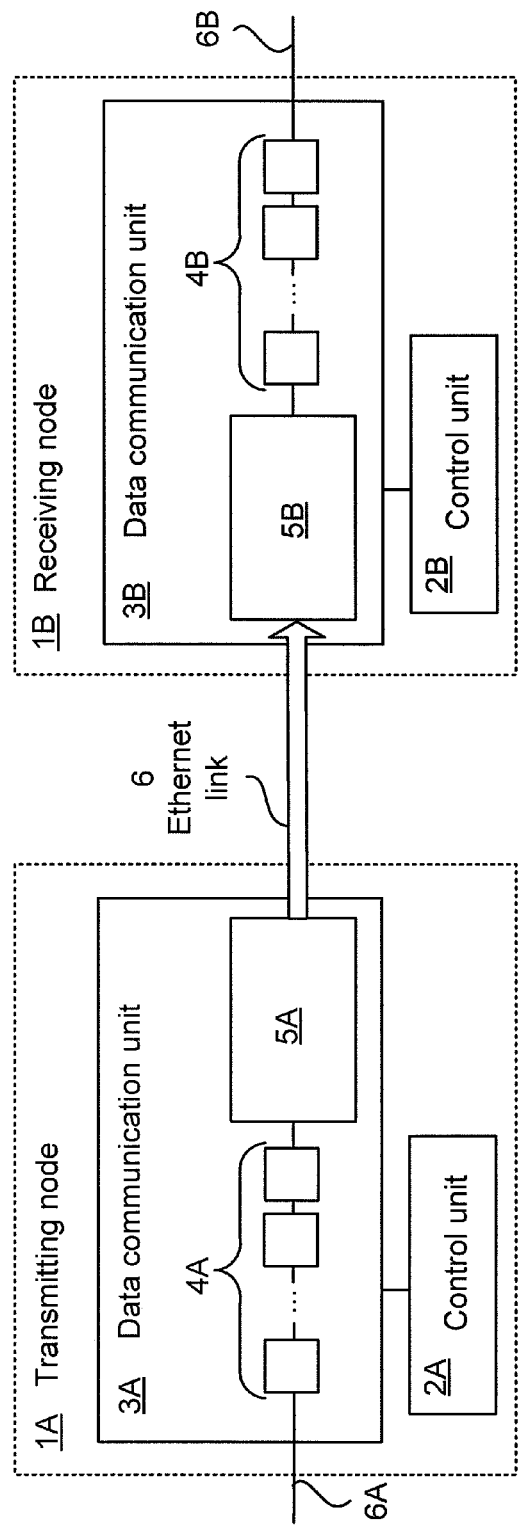
FIG. 4 shows a transmitting node and a receiving node according to an exemplary embodiment of the invention.

FIG. 4 shows a transmitting node 1A and a receiving node 1B according to an exemplary embodiment of the invention. The transmitting node 1A and the receiving node 1B may, for example, be comprised in a broadband multiplexer, a switch, a router or the like. The transmitting node 1A and the receiving node 1B each comprise a control unit 2A, 2B and a data communication unit 3A, 3B, respectively. The control units 2A, 2B may also be incorporated in the data communication unit 3A, 3B, respectively.

The data communication units 3A, 3B are arranged to provide the transmitting node 1A and the receiving node 1B with an Ethernet network interface. The data communication units 3A, 3B may therefore also be referred to as Ethernet network cards, Ethernet network adapters, Ethernet network interface controllers (NICs), Ethernet network interface cards or chips, or Ethernet LAN adapters or the like. The data communication units 3A, 3B are arranged to communicate over and to establish an Ethernet link 6 in between the transmitting node 1A and the receiving node 1B. The data communication units 3A, 3B may comprise any suitable number of components 4A, 5A, 4B, 5B which may provide suitable logic and circuitry that enable the data communication unit 3A to input/output streams of data over the chosen medium. Such data communication units 3A, 3B are very common in the state of the art, and may be found in various different configurations and designs. Since the inventive features described herein are applicable to any design, configuration and/or amount of hardware components used in the data communication units 3A, 3B, any detailed description of the large amount of variations of these components, their designs and/or collective configurations in the data communication units 3A, 3B are considered superfluous. However, the components 4A, 5A, 4B, 5B in the data communication units 3A, 3B are herein divided into actual input/output medium interface components 5A, 5B and underlying supporting electrical/optical components 4A, 4B. As an example, if the chosen medium is an optical medium, the input/output interface components 5A, 5B may comprise an optical transmitter/receiver, optical laser transmitter/receiver or the like. According to another example, if the chosen medium is a twisted pair medium, the input/output interface components 5A, 5B may comprise the transmitter/receiver or the like.

The data communication units 3A, 3B may be arranged to communicate over, for example, a copper wire twisted pair medium, an optical medium (such as a single or multimode fibre network) or the like. For transmission over copper wire twisted pair mediums, there are several forms of Ethernet standards, such as, for example, 10BASE-T, 100BASE-TX, and 1000BASE-T, etc. For transmission over optical mediums, there are several forms of optical fast-Ethernet standards, such as, 100BASE-FX, 100BASE-SX and 1000BASE-LX, etc. The data communication units 3A, 3B may be arranged to communicate using any one of these standards or the like.

The control units 2A, 2B are arranged to communicate with and control the data communication units 3A, 3B, respectively, and comprise logic for performing the functionality of the transmitting node 1A and receiving node 1B, respectively. This functionality may be implemented by means of a software or computer program. The control units 2A, 2B may also comprise storage means or a memory unit for storing the computer program and processing means or a processing unit, such as a microprocessor, for executing the computer program. The storage means may also be a readable storage medium separated from, but connected to the control units 2A, 2B. When, in the following, it is described that the control units 2A, 2B performs a certain function it is to be understood that the control units 2A, 2B in the transmitting node 1A and the receiving node 1B uses the processing means to execute a certain part of the program which is stored in their storage means. It should also be noted that the control units 2A, 2B and the data communication units 3A, 3B, respectively, may comprise shared computational and storage capabilities, and may be provided as one physical unit, or alternatively as a plurality of logically interconnected units.

The control units 2A, 2B and the data communication units 3A, 3B may also be arranged to receive input and output data over a data communication interface 6A, 6B, such as, for example, a data communication bus or the like. The control units 2A, 2B and the data communication units 3A, 3B may be arranged to communicate over the data communication interface 6A, 6B with higher level functions or protocols which may be running in a connected host, such as, for example, subsequent network nodes, computer systems or the like.

The control unit 2A in the transmitting node 1A may be arranged to support and operate in different Ethernet operational modes, i.e. modes of operation describing how to transmit over and maintain the Ethernet link. These may be pre-configured in the control unit 2A of the transmitting node 1A or may be negotiable during Ethernet auto-negotiation between the control unit 2A in the transmitting node 1A and the control unit 2B in the receiving node 1B when establishing the Ethernet link 6.

Figure 5:
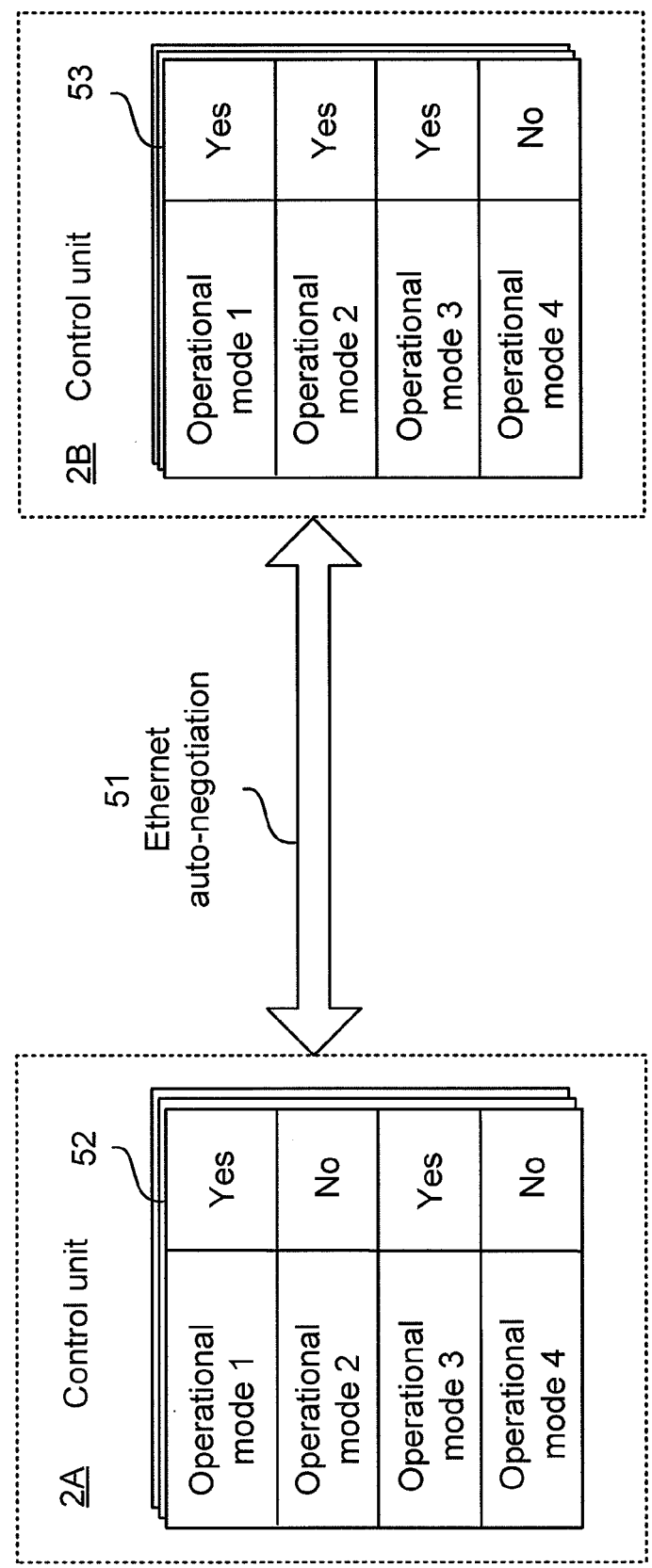
FIG. 5 illustrates an Ethernet auto-negotiation between control units comprised in network nodes.

FIG. 5 illustrates an Ethernet auto-negotiation 71 between the control units 2A, 2B comprised in transmitting node 1A and the receiving node 1B, respectively. Ethernet auto-negation 71 is a function supported in the Ethernet standard that allows network nodes at both the transmitting and receiving end of an Ethernet link to reject the use of operational modes that are not supported by both network nodes. When, for example, more than one common operational mode exists between the network nodes at the transmitting and receiving end of an Ethernet link, the auto-negotiation function also provides a mechanism arranged to allow the network nodes to resolve to a single mode of operation using a predetermined priority resolution function. An example of how such a predetermined priority resolution function can be described in relation to the example illustrations in FIG. 5. In FIG. 5, the control unit 2A in the transmitting node 1A may support one or more operational modes (as indicated in the column 72 in FIG. 5). The control unit 2B in the receiving node 1B may also support one or more operational modes (as indicated in the column 73 in FIG. 5). The predetermined priority resolution function may thus be arranged to check which operational modes are supported by the networks, and consequently reject the use of operational modes that are not supported by both network nodes. If one or more operational modes are supported by both network nodes for a particular function, the predetermined priority resolution function may also comprise a priority order for the operational modes and thus may be able to select only one of these operational modes as the single mode of operation. The Ethernet auto-negotiation function further allows the network nodes to switch between various operational modes in an ordered fashion. The Ethernet auto-negotiation may also permit the control unit 2A, 2B and/or higher level protocols to manage the Ethernet auto-negotiation, i.e. disable or enable, and to select a specific operational mode.

According to the Ethernet standard, after the Ethernet link has been negotiated, an Ethernet transmitting node 11 is arranged to loop in a normal IDLE state, i.e. the "SEND IDLE" state 21 as shown in FIG. 2, any time the Ethernet transmitting node 11 does not have any actual data to transmit. However, according to the invention, either by being pre-configured with an operational mode or by negotiating an operational mode with the control unit 2B in the receiving node 1B according to the above, the control unit 2A in the transmitting node 1A may further be arranged to also operate in a first IDLE state which defines how to perform IDLE data packet transmissions according to the invention. This new operational mode may also be referred to as an Ethernet Power Saving Mode (EPSM), or a "green IDLE state". The new operational mode, however, may only be entered if it is supported and configured on both the transmitting and receiving end of the Ethernet link 6, or supported and agreed upon by both the transmitting and receiving end of the Ethernet link 6 via Ethernet auto-negotiation. The latter may also be performed in order to maintain compatibility with network nodes and devices that does not yet support this operational mode.

In the new operational mode, the control unit 2A in the transmitting node 1A may be arranged to enter the first IDLE state directly as there is no actual data to transmit. The control unit 2A in the transmitting node 1A may also be arranged to, for example, enter or switch to the first IDLE state upon detecting that a predetermined data transmission inactivity timer has elapsed, and/or upon receiving a first IDLE state initiation signal from a higher level function or protocol. A switch may be performed, for example, from the normal IDLE state according to the Ethernet standard, which may be used as a default IDLE state for the control unit 2A.

When operating in said first IDLE state, the control unit 2A in the transmitting node 1A is arranged to transmit IDLE data packets periodically through the data communication unit 3A over the Ethernet link 6 according to at least one predetermined IDLE data packet timing interval. This predetermined IDLE data packet timing interval is outside the normal implementation specific time limits for maintaining Ethernet link synchronisation between the transmitting node 1A and the receiving node 1B. The predetermined IDLE data packet timing interval may be set or configured such that the IDLE data packets are transmitted very infrequently. The predetermined IDLE data packet timing interval may be also set according to one or several levels based on the degree of power reduction to be achieved. For example, it is possible to have a first level of the first IDLE state, wherein the predetermined IDLE data packet timing interval is based upon a time period at least long enough so as to allow at least one actual input/output medium interface components 5A comprised in the data communication unit 3A to be powered down and then powered back up again by the control unit 2A before it is time to transmit the next IDLE data packet. This first level is very simple and can be entered very quickly after a packet has been transmitted. The actual input/output medium interface components 5A may be any form of medium transmitter for transmitting over the chosen Ethernet medium. This first level is especially advantageous if the chosen Ethernet medium is an optical medium, and the input/output medium interface components 5A is an optical transmitter, optical laser transmitter or the like. This is because an optical transmitter is usually a relatively power consuming component in a network node. It should however also be noted that when powering down an optical transmitter, the crystal/oscillator in the optical transmitter may be kept in some form of operative state since it usually gains stability after having been warm for some period of time.

An example of a second level of the first IDLE state is where the predetermined IDLE data packet timing interval is based upon a time period at least long enough so as to allow a plurality of components 4A, 5A comprised in the data communication unit 3A to be powered down and then powered back up again by the control unit 2A before it is time to transmit the next IDLE data packet. The plurality of components may comprise the actual input/output medium interface components 5A along with one or several of the underlying supporting electrical/optical components 4A comprised in the transmitter electronics in the data communication unit 3A. This level is particularly advantageous when the control unit 2A, as in the present invention, is further arranged to control and power down/up at least one or more of the underlying supporting electrical/optical components 4A comprised in the transmitter electronics in the data communication unit 3A. The underlying supporting electrical/optical components 4A comprised in the transmitter electronics in the data communication unit 3A may comprise both analogue and digital parts.

It can here easily be understood that the first and/or the second level of the first IDLE state may be varied depending on various different aspects and implementations. It should also be understood that the first IDLE state may comprise a plurality of different levels, wherein each level may comprise a predetermined IDLE data packet timing interval suitable for a particular application or implementation. The predetermined IDLE data packet timing interval may, for example, be set for different long periods of time such as minutes, hours, days, weeks, months, etc. For an Ethernet link to an end user, the predetermined IDLE data packet timing interval may, for example, be set for several hours in order to save energy, or perhaps even longer during night time since a possible interruption or failure of the Ethernet link may not matter to the end user as much during this time.

In the new operational mode, the control unit 2A in the transmitting node 1A may be arranged to switch from the first IDLE state to a default state, for example, the normal IDLE state according to the Ethernet standard. This enables the control unit 2A in the transmitting node 1A to start sending IDLE data packets to the control unit 2B in the receiving node 1B in order to immediately "wake up" the receiving node 1B. This further enables a fast detection if the Ethernet link 6 is still operational before any actual data is transmitted over the Ethernet link 6. The control unit 2A in the transmitting node 1A may also be arranged to directly exit any IDLE state and enter an active state, i.e. transmitting actual data packets over the Ethernet link 6. This may, for example, be based upon the control unit 2A in the transmitting node 1A monitoring if there is any actual data to transmit. The control unit 2A in the transmitting node 1A may further be arranged to switch between any one of the active state, the first IDLE state according to the invention and the normal IDLE state according to the Ethernet standard.

As described above, the first IDLE state according to the invention may only be entered if it is supported and configured on both the transmitting and receiving end of the Ethernet link 6, or supported and agreed upon by both the transmitting and receiving end of the Ethernet link 6 via Ethernet auto-negotiation. According to the Ethernet standard, after an Ethernet link has been negotiated, the receiving node 12 in FIG. 1 is arranged to loop in a normal IDLE state, i.e. the "RECEIVE IDLE DETECT/CONFIRM" state 31 as shown in FIG. 3, when the receiving node 12 does not receive any actual data from an Ethernet transmitting node 11 in FIG. 1. If the Ethernet receiving node 12 does not receive any IDLE data packets or actual data from the Ethernet transmitting node 11 according to the Ethernet standard, the Ethernet receiving node 12 will declare the Ethernet link 13 as failed or down, i.e. in a non-active state.

Therefore, in the new operational mode and accordance with the invention, the control unit 2B in the receiving node 1B in FIG. 4 is arranged to operate in a first IDLE state corresponding to the first IDLE state of the control unit 2A in the transmitting node 1A, which defines how IDLE data packet transmissions should be received according to the invention. The control unit 2B in the receiving node 1B is arranged to enter or switch to its corresponding first IDLE state in synchronisation with and at substantially the same time as the control unit 2A in the transmitting node 1A. The control unit 2B in the receiving node 1B may be arranged to, for example, enter or switch to the corresponding first IDLE state upon detecting that a predetermined data reception inactivity timer has elapsed, and/or upon receiving a first IDLE state initiation signal from a higher level function or protocol.

When operating in said corresponding first IDLE state, the control unit 2B in the receiving node 1B is arranged to receive IDLE data packets periodically through the data communication unit 3B over the Ethernet link 6 according to at least one predetermined IDLE data packet timing interval. This predetermined IDLE data packet timing interval is outside the normal implementation specific time limits for maintaining Ethernet link synchronisation between the transmitting node 1A and the receiving node 1B. The predetermined IDLE data packet timing interval may be set or configured such that the IDLE data packets are received very infrequently. Furthermore, when operating in the first IDLE state, the control unit 2B in the receiving node 1B is arranged to maintain the Ethernet link 6 in a link active state in between the periodic receptions of IDLE data packets. In order words, even if no IDLE data packets or actual data is received over the Ethernet link 6, the control unit 2B in the receiving node 1B still considers the Ethernet link 6 as up and operational, however not as being synchronised with the transmitting node 1A. The receiving node 1B is continuously up and operational, that is, the actual input/output medium interface components 5B and underlying supporting electrical/optical components 4B comprised in the data communication unit 3B in the receiving node 1B may be continuously powered and operational.

In the new operational mode, the control unit 2B in the receiving node 1B may also be arranged to switch from the first IDLE state to a default state, for example, the normal IDLE state according to the Ethernet standard. This may performed upon continuously receiving IDLE data packets over the Ethernet link 6 in accordance with the normal IDLE state according to the Ethernet standard. The control unit 2B in the receiving node 1B may also be arranged to directly exit any IDLE state and enter an active state upon receiving actual data packets over the Ethernet link 6. The control unit 2A in the receiving node 1A may further be arranged to switch between any one of the states comprising an active state, the first IDLE state according to the invention, and the normal IDLE state according to the Ethernet standard.

From the description above is should be understood that the predetermined IDLE data packet timing interval between periodic transmissions of the IDLE data packets in the first IDLE state must be pre-configured, or an negotiated and agreed state, on both ends of the Ethernet link 6, that is, in both the transmitting node 1A and receiving node 1B. The periodic transmissions in the first IDLE state may then be used as a very infrequent keep-alive signal on the Ethernet link 6. This, for example, makes it possible to detect and declare if the Ethernet link 6 has failed or is down.

Figure 6:
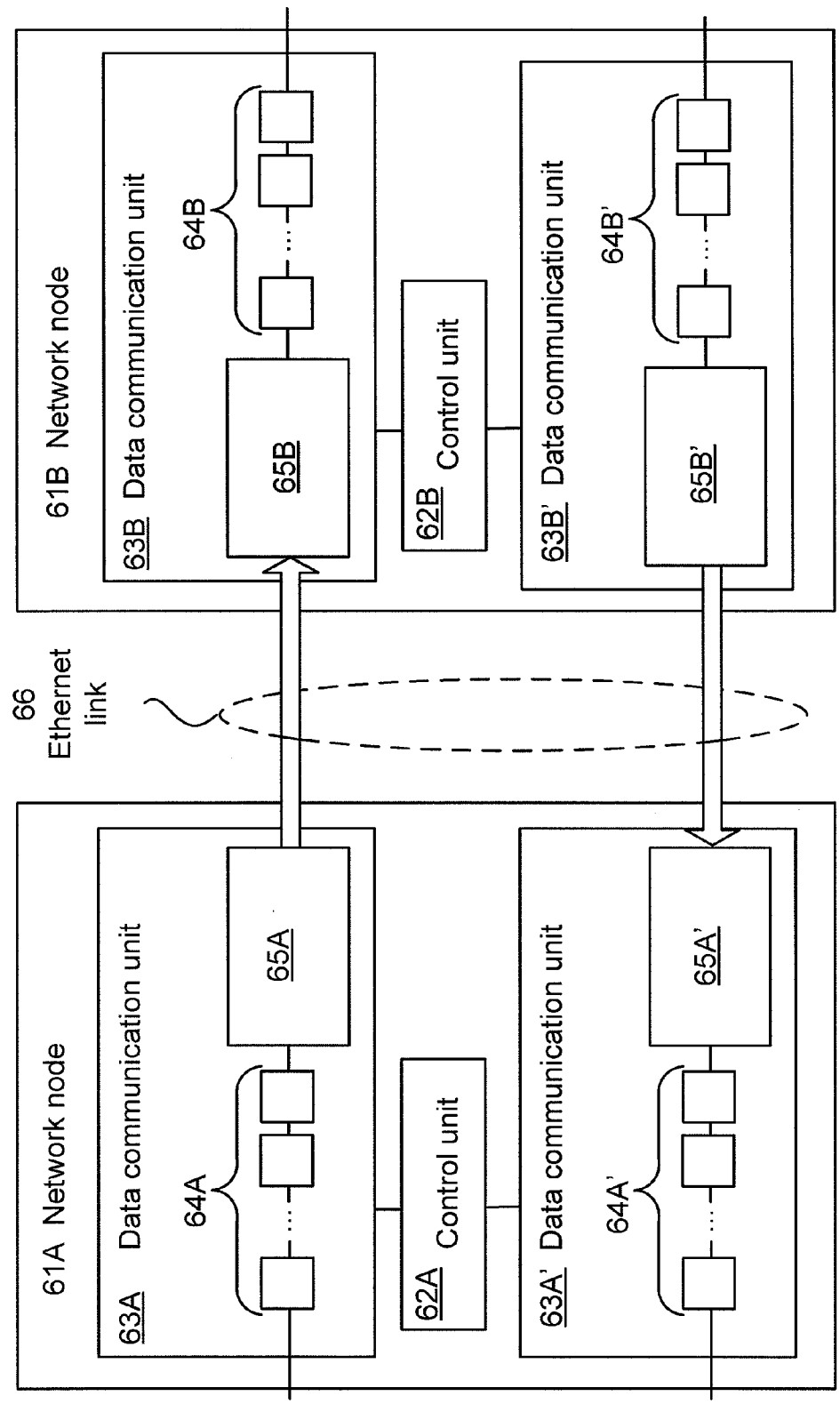
FIG. 6 shows a network node according to another exemplary embodiment of the invention.

FIG. 6 shows network nodes 61A, 61B according to another exemplary embodiment of the invention. The network nodes 61A, 61B each comprises a transmitting node and a receiving node, such as, the transmitting node 1A and receiving node 1B described in reference to FIG. 4. In this embodiment, the data communication units 63A, 63B' may correspond to the data communication unit 3A, and the data communication units 63B, 63A' may correspond to the data communication unit 3B. The control unit 62A may be arranged to control both the data communication units 63A, 63A' in accordance with the operation of the previously described control units 2A, 2B in reference to FIG. 4. The control unit 62B may be arranged to control both the data communication units 63B, 63B' in accordance with the operation of the previously described control units 2A, 2B in reference to FIG. 4. The network nodes 61A, 61B may thus act as both a transmitting node and receiving node over the Ethernet link 66.

Figure 7:
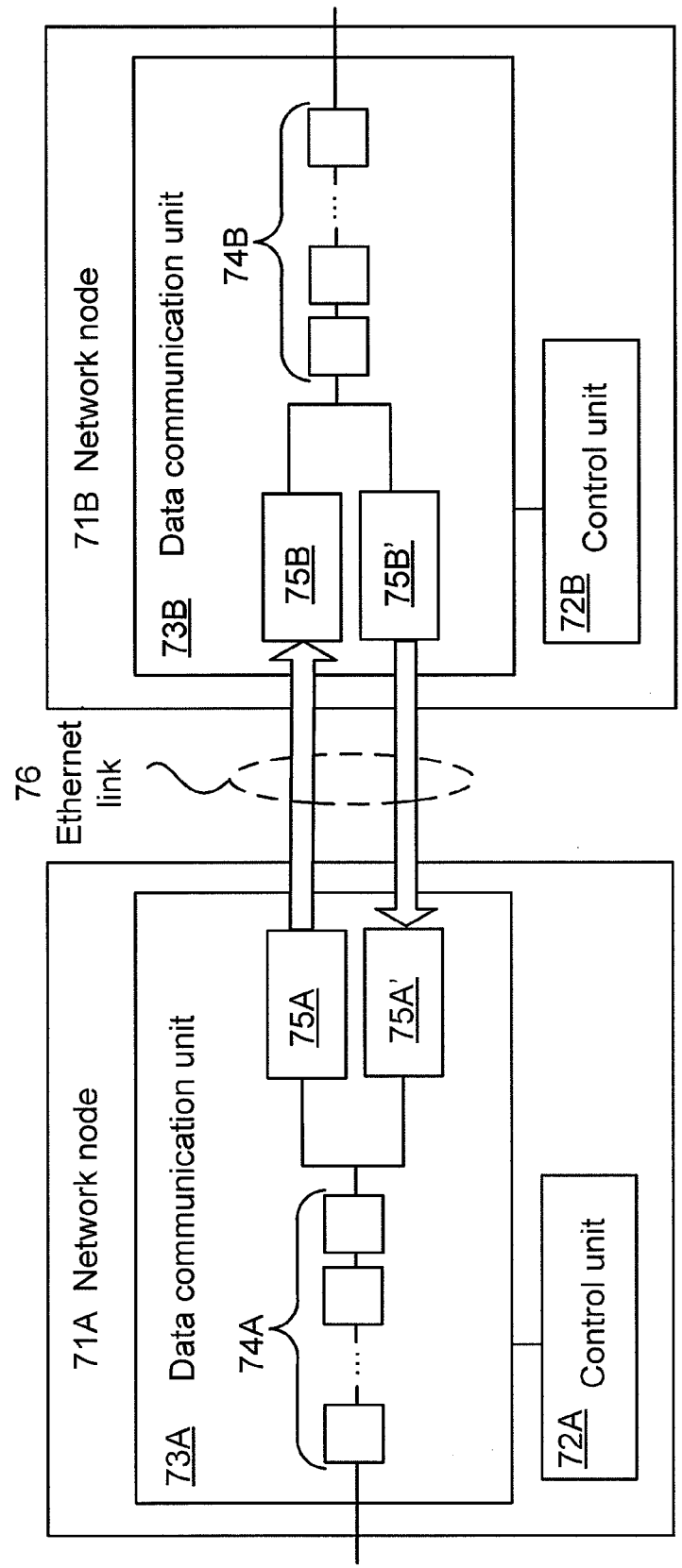
FIG. 7 shows another network node according to a further exemplary embodiment of the invention.

FIG. 7 shows network nodes 71A, 71B according to a further exemplary embodiment of the invention. The network nodes 71A, 71B each comprises a transmitting node and a receiving node, such as, the transmitting node 1A and receiving node 1B described in reference to FIG. 4. In this embodiment, the data communication unit 73A may incorporate both the actual input/output medium interface components 75A, 75A' corresponding to the actual input/output medium interface components 5A, 5B in FIG. 4. The data communication unit 73A may comprise shared underlying supporting electrical/optical components 74A for both the actual input/output medium interface components 75A, 75A'. The control unit 72A may be arranged to control the data communication unit 73A in accordance with the operation of the previously described control units 2A, 2B in reference to FIG. 4. The data communication unit 73B may incorporate both the actual input/output medium interface components 75B, 75B' corresponding to the actual input/output medium interface components 5A, 5B in FIG. 4. The data communication unit 73B may comprise shared underlying supporting electrical/optical components 74B for both the actual input/output medium interface components 75B, 75B'. The control unit 72B may be arranged to control the data communication unit 73B in accordance with the operation of the previously described control units 2A, 2B in reference to FIG. 4. The network nodes 71A, 71B may thus act as both a transmitting node and receiving node over the Ethernet link 76.

It should be noted that in this embodiment, the control units 73A, 73B may be arranged to power down either only the actual input/output medium interface components 75A, 75B', i.e. the actual transmitters, and/or any one of the underlying supporting electrical/optical components 74A, 74B used by the actual input/output medium interface components 75A, 75B', when operating in said first IDLE state.

Figure 8:
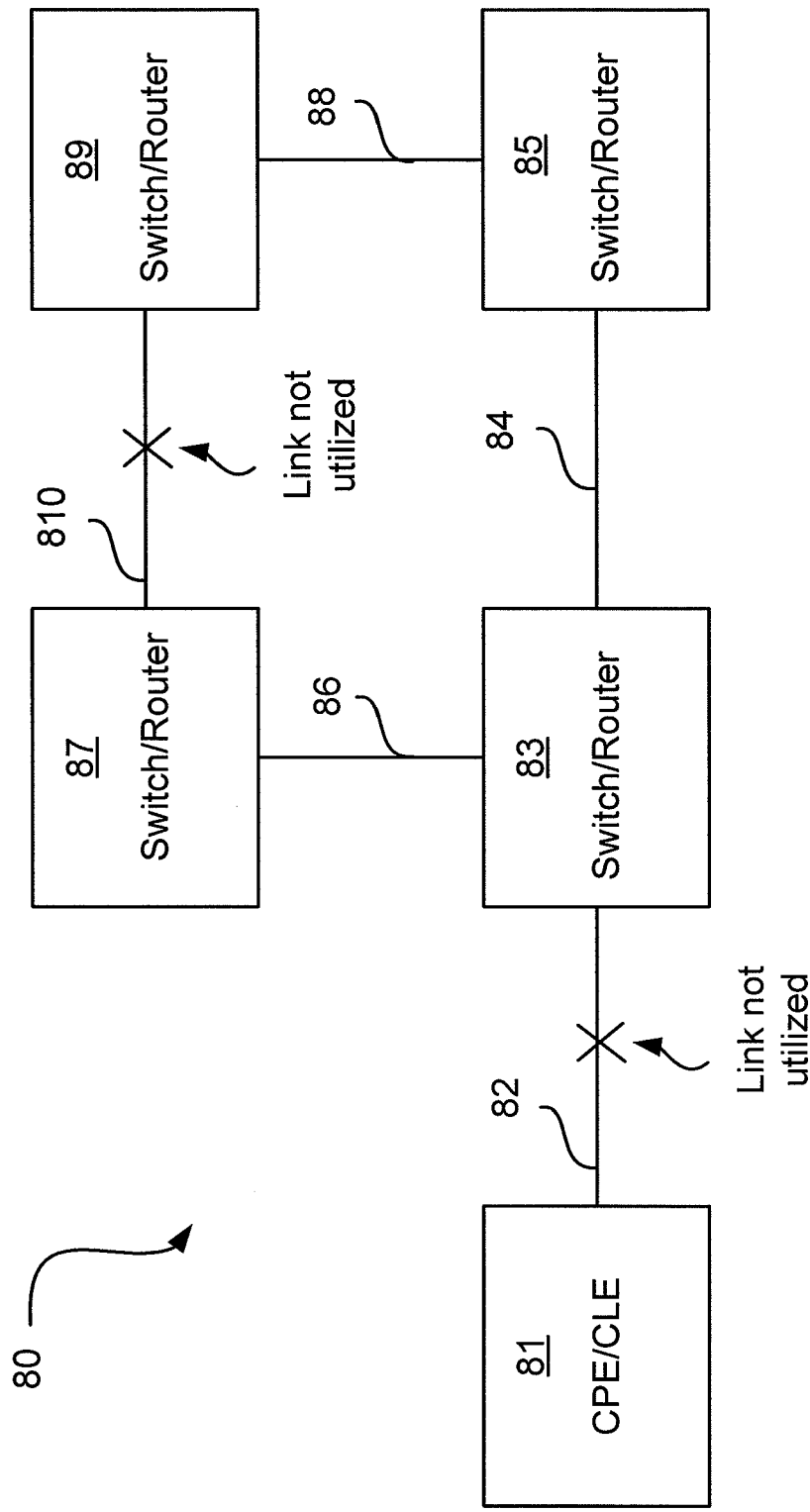
FIG. 8 illustrates a system comprising a network node according to any of the exemplary embodiments of the invention described in FIGS. 4-7.

FIG. 8 illustrates a system 80 comprising at least two of the network nodes 1A, 1B, 61A, 61B, 71A, 71B according to the exemplary embodiments of the invention described in FIGS. 4-7. The system 80 comprises a customer premises equipment/customer located equipment (CPE/CLE) 81 connected via an Ethernet link 82 to a first router/switch 83. The first router/switch 83 is further connected via an Ethernet link 84 to a second router/switch 85, and via an Ethernet link 86 to a third router/switch 87. The second router/switch 85 is connected via an Ethernet link 88 to a fourth router/switch 89, and the fourth router/switch 89 is further connected via an Ethernet link 810 to the third router switch 87. This configuration of network nodes may occur in various systems or networks and provides redundancy and alternative transmission paths for the data traffic transmitted between network nodes.

However, if the Ethernet link 82 between the CPE/CLE 81 and the first router/switch 83 is not utilized and the CPE/CLE 81 is a network node according to the Ethernet standard, the CPE/CLE 81 will be continuously operational and fully powered, and continuously send IDLE data packets in order to keep the Ethernet link 82 up and operational even though the Ethernet link 82 is not utilized. However, if the CPE/CLE 81 is a transmitting node or network node 1A, 61A, 61B, 71A, 71B according to any one of the embodiments described above and the switch/router 83 is a receiving node or network node 1B, 61A, 61B, 71A, 71B according to any one of the embodiments described above, the CPE/CLE 81 and the switch/router 83 may switch to a first IDLE state according to the invention, wherein the CPE/CLE 81 may power down at least one data transmission component in between the periodic transmissions of IDLE data packets. This may significantly reduce the power consumption of the CPE/CLE 81, while at the same time maintaining the Ethernet link 82 up and operational.

An advantage of the system 80 is that the same principle may be applied for all of the network nodes and 81, 83, 85, 87, 89 and Ethernet links 84, 86, 88, 810 in the system. If, for example, the Ethernet link 810 is not utilized for transmitting data packets between the CPE/CLE 81 and the switch/router 85 unless the Ethernet link 84 is down or not operational, the switch/router 87 and the switch/router 89 may according to the invention switch to a first IDLE state, wherein the switch/router 87 may power down at least one data transmission component in between its periodic transmissions of IDLE data packets. This may significantly reduce the power consumption of the switch/router 87, while at the same time maintain the Ethernet link 810 up and operational.

Figure 9:
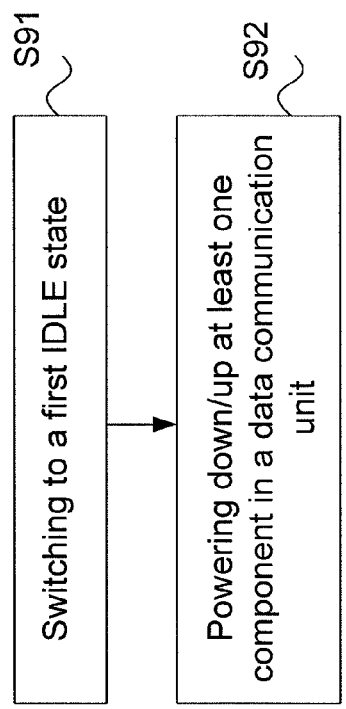
FIG. 9 shows a flowchart illustrating a method according to an exemplary embodiment of the invention.

FIG. 9 shows a flowchart illustrating a method according to an exemplary embodiment of the invention. It describes a general method for use in a transmitting node or network node according to any one of the embodiments described above.

In step S91, the control unit in the transmitting node or network node may switch to a first IDLE state. In this first IDLE state, the control unit periodically transmits IDLE data packets are over an Ethernet link according to at least one predetermined IDLE data packet timing interval, wherein said predetermined IDLE data packet timing interval is outside the normal implementation specific time limits for maintaining Ethernet link synchronisation between the transmitting node/network node and a receiving node/network node.

The use of the first IDLE state in the control unit may be preconfigured in the control unit or negotiated by the control unit during Ethernet link auto-negotiation with the receiving node.

In step S92, the control unit, operating in the first IDLE state, may power down at least one component comprised in a data communication unit in between the periodic transmissions of IDLE data packets.

Figure 10:
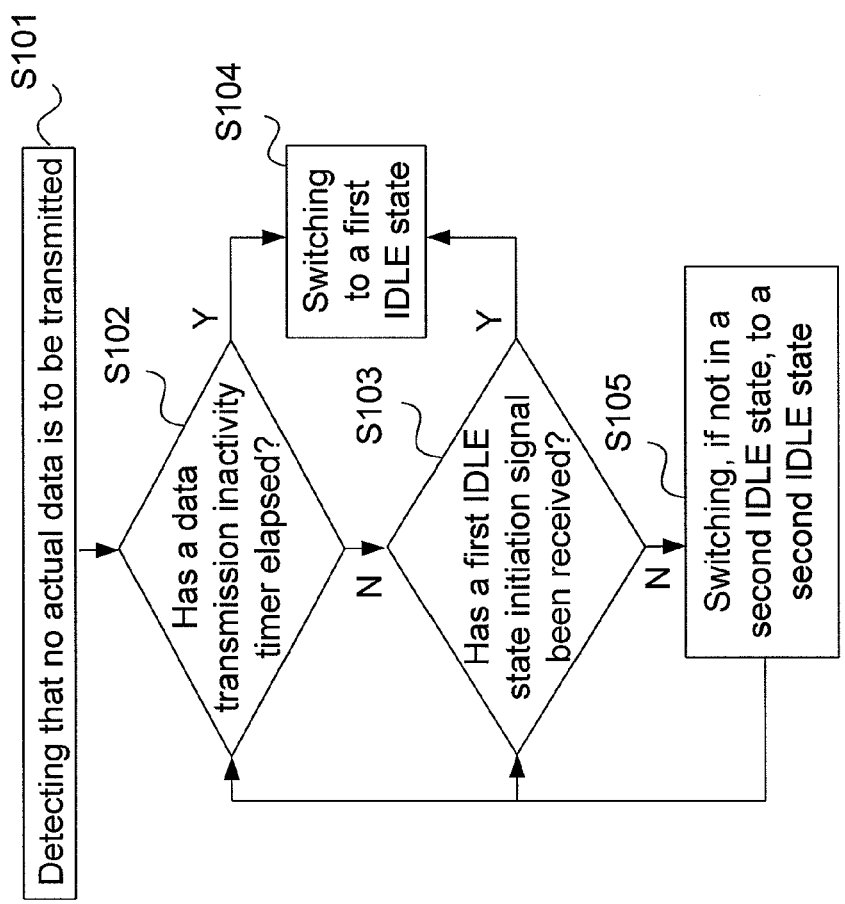
FIG. 10 shows a flowchart illustrating another method according to an exemplary embodiment of the invention.

FIG. 10 shows a flowchart illustrating another method according to an exemplary embodiment of the invention. The method may describe step S91 in FIG. 9 in more detail when the use of the first IDLE state has been agreed upon by the transmitting node and the receiving node.

In step S101, the control unit in the transmitting node or network node may detect that no actual data is to be transmitted over the Ethernet link. In step S102, the control unit may check, or be notified of, if a data transmission inactivity timer has elapsed. If the data transmission inactivity timer has elapsed, the control unit may switch to the first IDLE state in step S104. If the data transmission inactivity timer has not elapsed, the control unit may in step S103 check if a first IDLE state initiation signal from a higher level protocol has been received. If a first IDLE state initiation signal from a higher level protocol has been received, the control unit may switch to the first IDLE state in step S104. If a first IDLE state initiation signal from a higher level protocol has not been received, the control unit may switch to the second IDLE state in step S105. The second IDLE state may be the normal IDLE state according to the Ethernet standard. The control unit may then iterate the steps S102, S103 and S105 until one of the conditions in step S102 and S103 is fulfilled, whereby the control unit may switch to the first IDLE state. It should be noted that the steps S102 and S103 may occur in a different order, and that the control unit may receive a first IDLE state initiation signal from a higher level protocol at any point in time and then switch to the first IDLE state.

Figure 11:
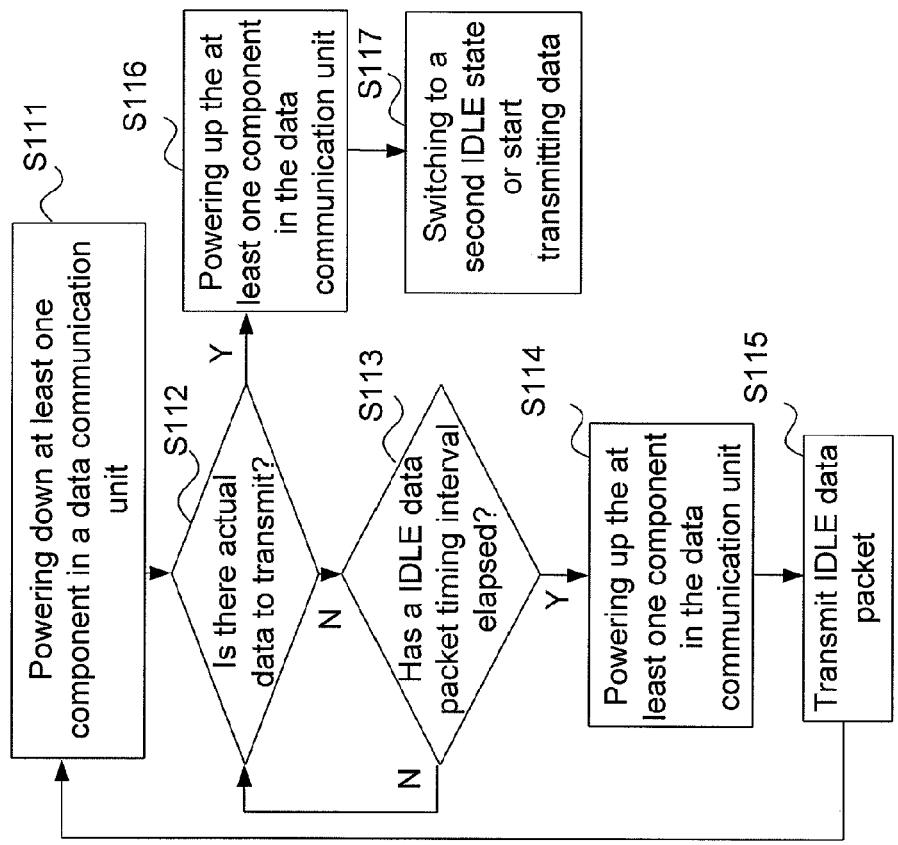
FIG. 11 shows a flowchart illustrating a further method according to an exemplary embodiment of the invention.

FIG. 11 shows a flowchart illustrating a further method according to an exemplary embodiment of the invention. The method may describe step S92 of the method in FIG. 9 in more detail, when the use of the first IDLE state has been agreed upon by the transmitting node and the receiving node.

In step S111, the control unit in the transmitting node or network node, operating in the first IDLE state, may power down at least one component comprised in a data communication unit. In step S112, the control unit may check, or be notified of, if there is any actual data to transmit. If there is any actual data to transmit, the control unit may power up the at least one component comprised in a data communication unit in step S116 and switch to a second IDLE state or start transmitting actual data in step S117. If there is not any actual data to transmit, the control unit may check, or be notified of, if a IDLE data packet timing interval has elapsed in step S113. If an IDLE data packet timing interval has not elapsed in step S113, the control unit may return to step S112. If an IDLE data packet timing interval has elapsed in step S113, the control unit may power up the at least one component comprised in a data communication unit in step S116 and transmit an IDLE data packet in step S115. The control unit may the return to step S111, and power down the at least one component comprised in a data communication unit.

FIG. 12 shows a flowchart illustrating a method according to an exemplary embodiment of the invention. It describes a general method for use in a receiving node or network node according to any one of the embodiments described above.

In step S121, the control unit in the transmitting node or network node may switch to a first IDLE state. In this first IDLE state, the control unit periodically receives IDLE data packets are over an Ethernet link according to at least one predetermined IDLE data packet timing interval, wherein said predetermined IDLE data packet timing interval is outside the normal implementation specific time limits for maintaining Ethernet link synchronisation between the transmitting node/network node and a receiving node/network node. The use of the first IDLE state in the control unit may be preconfigured in the control unit or negotiated by the control unit during Ethernet link auto-negotiation with the transmitting node.

In step S122, the control unit, operating in the first IDLE state, may maintain the Ethernet link in a link active state in between the periodic receptions of IDLE data packets. This may be performed in the control unit without requiring the Ethernet network nodes to remain synchronised. The control unit may also switch to a second IDLE state upon continuously receiving IDLE data packets over the Ethernet link, and/or to directly exit the first IDLE state as actual data is received over the Ethernet link. The second IDLE state may be the normal IDLE state according to the Ethernet standard.

Another advantage of the invention is that it can be added as an extension of the existing standard and products. The invention may directly be implemented in existing products without requiring an update of the hardware.

The present invention also relates to a computer program product for use in a control unit in a transmitting node as described in the embodiments above, which comprises computer readable code means, which when run in the control unit in the transmitting node causes the control unit to perform any one of the steps described in the methods described above. The code means of the computer program product may be stored on any form of readable storage medium.

The present invention further relates to a computer program product for use in a control unit in a receiving node as described in the embodiments above, which comprises computer readable code means, which when run in the control unit in the receiving node causes the control unit to perform the operations of the receiving node. The code means of the computer program product may be stored on any form of readable storage medium.

The description above is of the best mode presently contemplated for practicing the present invention. The description is not intended to be taken in a limiting sense, but is made merely for the purpose of describing the general principles of the invention. The scope of the present invention should only be ascertained with reference to the issued claims.

The invention claimed is:

1. A transmitting node for transmitting data to a receiving node over at least one Ethernet link comprising a data communication unit arranged to transmit data over the at least one Ethernet link, and a control unit arranged to control the data communication unit so as to maintain the at least one Ethernet link in a link active state, the control unit is arranged to:

operate in a first IDLE state in which IDLE data packets are transmitted periodically through the data communication unit over the at least one Ethernet link according to at least one predetermined IDLE data packet timing interval, and in said first IDLE state, power down at least one component comprised in the data communication unit in between the periodic transmissions of IDLE data packets.

2. A transmitting node according to claim 1, wherein the at least one predetermined IDLE data packet timing interval is based upon a time period at least long enough so as to allow at least one component comprised in the data communication unit to be powered down and then powered back up again by the data communication unit before sending the next IDLE data packet.

3. A transmitting node according to claim 1, wherein the at least one predetermined IDLE data packet timing interval is based upon a time period at least long enough so as to allow a plurality of components comprised in the data communication unit to be powered down and then powered back up again by the data communication unit before sending the next IDLE data packet.

4. A transmitting node (1A) according to claim 1, wherein said control unit is arranged to switch to the first IDLE state upon detecting that a predetermined data transmission inactivity timer has elapsed, and/or upon receiving a first IDLE state initiation signal from a higher level function or protocol.

5. A transmitting node according to claim 1, wherein the first IDLE state is an operational mode of the control unit negotiable during Ethernet auto-negotiation between the transmitting node and the receiving node when establishing the at least one Ethernet link.

6. A transmitting node according to claim 1, wherein said control unit is further arranged to switch to a second IDLE state in which IDLE data packets are continuously transmitted through the data communication unit over the at least one Ethernet link in order to keep the transmitting node synchronized with the receiving node, and to maintain the at least one Ethernet link in the link active state.

7. A transmitting node according to claim 6, wherein said control unit is arranged to switch between an active state, the first IDLE state and the second IDLE state based upon if there is any actual data to transmit; and/or to directly exit the first IDLE state as actual data is transmitted over the at least one Ethernet link.

8. A method for use in a transmitting node for transmitting data to a receiving node over at least one Ethernet link, wherein said transmitting node comprises a data communication unit arranged to transmit data over the at least one Ethernet link, and a control unit arranged to control the data communication unit so as to maintain the at least one Ethernet link in a link active state, the method comprises the steps of:
  switching in the control unit in the transmitting node to operate in a first IDLE state in which IDLE data packets are transmitted periodically over the at least one Ethernet link according to at least one predetermined IDLE data packet timing interval, and
  when operating in the first IDLE state, powering down at least one component comprised in the data communication unit in between the periodic transmissions of IDLE data packets.

9. A method according to claim 8, further comprising the step of:
  negotiating the use of the first IDLE state in the control unit during Ethernet link auto-negotiation with the receiving node.

10. A method according to claim 8, further comprising the step of:
  switching to the first IDLE state in said control unit upon detecting that a predetermined data transmission inactivity timer has elapsed, and/or upon receiving a first IDLE state initiation signal from a higher level function or protocol.

11. A method according to claim 10, further comprising the steps of
  switching between an active state, the first IDLE state and a second IDLE state based upon if there is any actual data to transmit; and/or directly exiting the first IDLE state as actual data is transmitted over the at least one Ethernet link.

12. A receiving node for receiving data from a transmitting node over at least one Ethernet link comprising a data communication unit arranged to receive data over the at least one Ethernet link, and a control unit arranged to control the data communication unit so as to maintain the at least one Ethernet link in a link active state, the control unit is arranged to:
  operate in a first IDLE state in which IDLE data packets are received periodically through the data communication unit over the at least one Ethernet link according to at least one predetermined IDLE data packet timing interval, and when operating in the first IDLE state, maintain the at least one Ethernet link in the link active state in between the periodic receptions of IDLE data packets.

13. A receiving node according to claim 12, wherein said control unit is arranged to switch to a second IDLE state upon continuously receiving IDLE data packets over the at least one Ethernet link, and/or to directly exit the first IDLE state as actual data is received over the at least one Ethernet link.

14. A network node for transmitting and receiving data over the at least one Ethernet link, comprising at least one transmitting node and at least one receiving node according to claim 12.

15. A method for use in a receiving node for receiving data from a transmitting node over at least one Ethernet link, wherein said receiving node comprises a data communication unit arranged to transmit data over the at least one Ethernet link, and a control unit arranged to control the data communication unit so as to maintain the at least one Ethernet link in a link active state, the method comprises the steps of:
  switching in the control unit in the receiving node to operate in a first IDLE state in which IDLE data packets are received periodically through the data communication unit over the at least one Ethernet link according to at least one predetermined IDLE data packet timing interval, and
  when operating in the first IDLE state, maintaining the at least one Ethernet link in the link active state in between the periodic receptions of IDLE data packets.

16. A method according to claim 15, further comprising the step of:
  switching to a second IDLE state upon continuously receiving IDLE data packets over the at least one Ethernet link, and/or to directly exit the first IDLE state as actual data is received over the at least one Ethernet link.

17. A network node for transmitting and receiving data over the at least one Ethernet link, comprising at least one transmitting node according to claim 1, and at least one receiving node.

* * * * *

UNITED STATES PATENT AND TRADEMARK OFFICE
CERTIFICATE OF CORRECTION

PATENT NO.        : 8,595,531 B2                                      Page 1 of 1
APPLICATION NO.   : 13/258070
DATED             : November 26, 2013
INVENTOR(S)       : Thyni et al.

It is certified that error appears in the above-identified patent and that said Letters Patent is hereby corrected as shown below:

In the Drawings

In Fig. 3, Sheet 3 of 10, delete "($RA_{n-1}$, $RB_{n-1}$) = 1nd ESD vector*" and insert -- ($RA_{n-1}$, $RB_{n-1}$) =1st ESD vector* --, therefor.

In Fig. 11, Sheet 10 of 10, for Tag "S113", in Line 1, delete "Has a" and insert -- Has an --, therefor.

In the Specification

In Column 11, Line 9, delete "receiving node 1A" and insert -- receiving node 1B --, therefor.

In Column 12, Lines 1-2, delete "control units 73A, 73B" and insert -- control units 72A, 72B --, therefor.

In Column 13, Line 52, delete "a IDLE" and insert -- an IDLE --, therefor.

In the Claims

In Column 15, Line 11, in Claim 4, delete "node (1A)" and insert -- node --, therefor.

In Column 16, Line 5, in Claim 11, delete "steps of" and insert -- steps of: --, therefor.

Signed and Sealed this
Twenty-second Day of July, 2014

Michelle K. Lee
*Deputy Director of the United States Patent and Trademark Office*